June 24, 1930.   H. D. JACKSON ET AL   1,767,366
SKID CHAIN FOR MOTOR VEHICLES
Filed July 27, 1928   2 Sheets-Sheet 1

INVENTORS.
H.D. JACKSON
F. WHITE

June 24, 1930. H. D. JACKSON ET AL 1,767,366
SKID CHAIN FOR MOTOR VEHICLES
Filed July 27, 1928 2 Sheets-Sheet 2
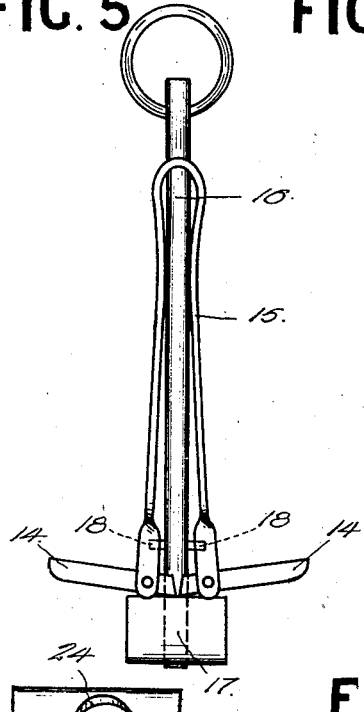
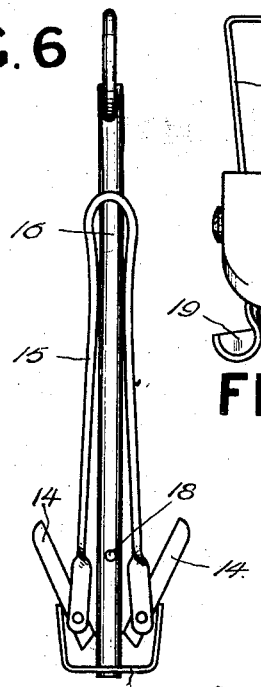
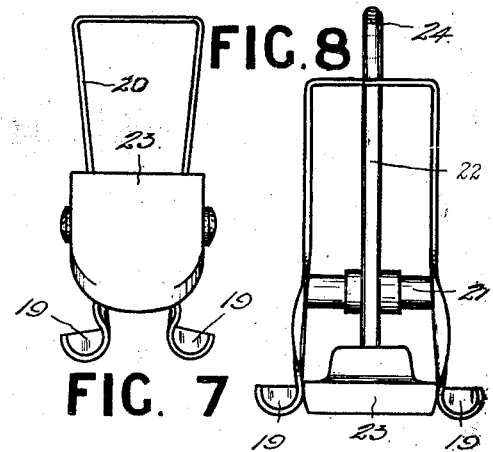
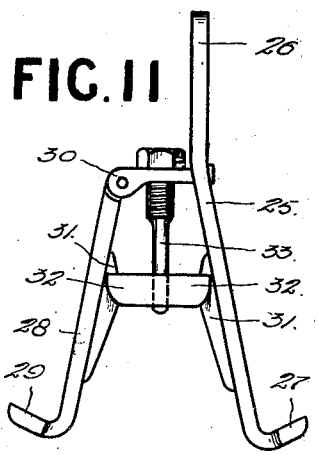
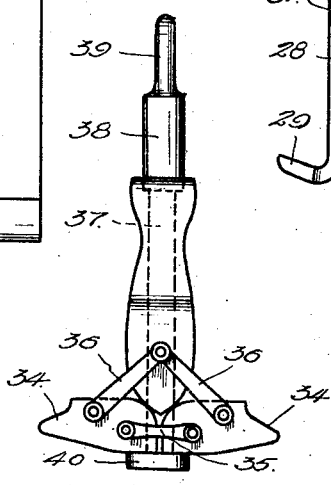
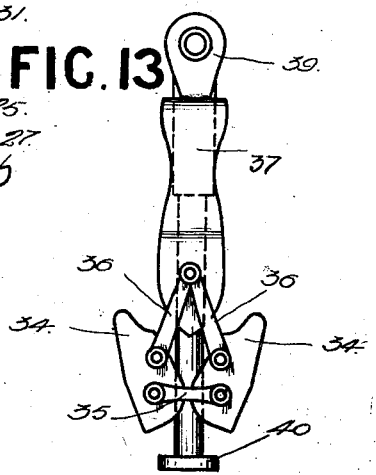
INVENTORS.
H.D. JACKSON
F. WHITE Patented June 24, 1930

1,767,366

UNITED STATES PATENT OFFICE

HERBERT DAVID JACKSON AND FRANK WHITE, OF WALSALL, ENGLAND

SKID CHAIN FOR MOTOR VEHICLES

Application filed July 27, 1928, Serial No. 295,762, and in Great Britain November 23, 1927.

This invention relates to improvements in skid chains for motor vehicles and refers particularly to skid chains for use on the twin wheels employed on heavy vehicles such as motor-omnibuses.

Various forms of skid chains have been proposed, but each form has certain definite limitations in its use and adaptability, and a twin wheel, or a wheel having twin pneumatic tyres, presents a difficult problem owing to the fact that there is frequently insufficient clearance between the inside of the inner tyre and the spring to allow of the use of a chain passing round the rim and tyres. Further, a continuous type of chain encircling the wheel is not suitable, as to fit the chain it is necessary to jack up the wheel and this takes a considerable time with a heavy vehicle.

The object of our invention is to provide an improved form of skid chain which can be rapidly and easily fitted to any twin wheel without jacking it up, and which is not affected by lack of clearance on the inner side of the wheel.

Our invention comprises a skid chain having at one end an expansible anchorage member which can be collapsed to drop between the adjacent rims of the twin wheel and then expanded to lock behind the rims or parts associated therewith, so that it cannot be withdrawn by the pull of the chain which is adapted to be stretched round the tyre on the outer rim and secured at its other end to the outer face of the wheel in any convenient manner. Any number of such chains may be employed on a wheel, and if desired each anchorage member may carry two or more chains.

It will be obvious that these chains can be very easily fitted by the driver of a vehicle should adverse road conditions be encountered, and very little time is required for the fitting.

The collapsible anchorage member may be arranged in a variety of different ways.

The application of our invention to a twin wheel for a heavy vehicle and a number of different forms of collapsible anchorage members are illustrated in the accompanying drawings in which:—

Figures 5 and 6 are side elevations of another form of anchorage member extended and collapsed.

Figures 7, 8 and 9 are views of another form showing respectively the member in side elevation collapsed and expanded and in perspective front elevation expanded.

Figures 10 and 11 are side elevations of another form collapsed and expanded.

Figures 12 and 13 are side elevations of another form expanded and collapsed.

Figure 1:
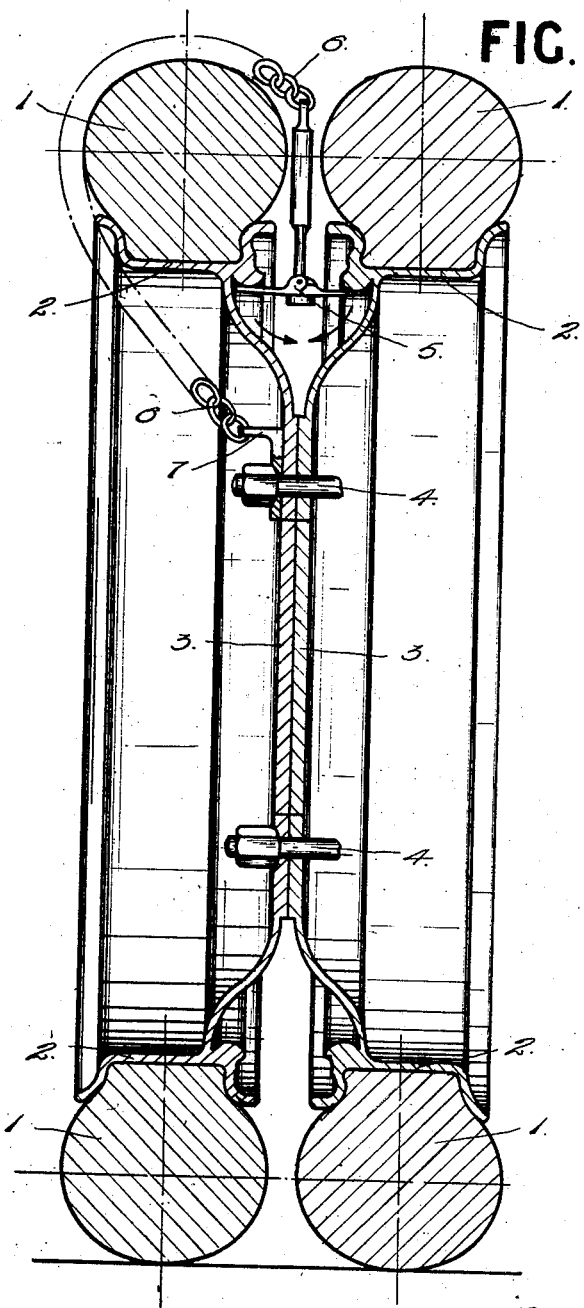
Figure 1 is a section through a twin wheel showing one of our chains fitted.

As shown in Figure 1 the twin wheel in common use on motor-omnibuses and other heavy vehicles has two tyres 1, 1 carried by spaced rims 2, 2 on wheel discs 3, 3 which are secured to the hub or brake-drum by bolts 4.

Our improved form of skid chain as applied to such wheels consists of a collapsible anchorage member 5 which can be collapsed to drop between the inner edges of the rims 2, 2 and then expanded to lock behind the rims. Secured to the outer end of the member 5 is a chain 6 which is adapted to be stretched around the tyre on the outer rim and then secured to the outer face of the wheel in any suitable manner. In the form illustrated the outer end of the chain carries an anchorage plate 7 which is retained by one of the usual wheel retaining bolts 4.

To remove any chain its outer end is disconnected and the anchorage member is either collapsed mechanically to allow it to be withdrawn from between the rims, or the chain and anchorage member are slipped round towards the bottom of the wheel when the anchorage member will collapse automatically under gravity and will fall out.

Figure 2:
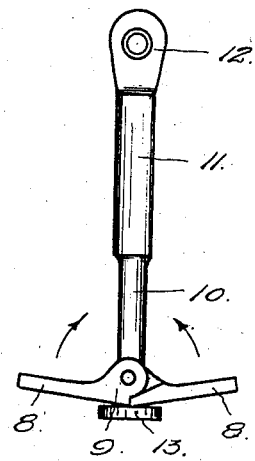
Figures 2, 3 and 4 are views of a preferred form of anchorage member showing respectively the member in side elevation extended and collapsed and in plan extended.
Figure 3:
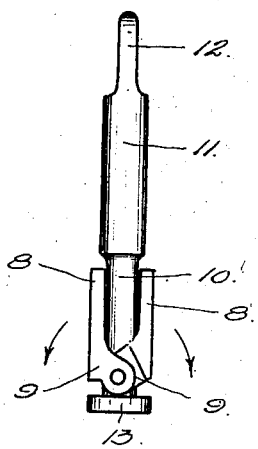
Figure 4:
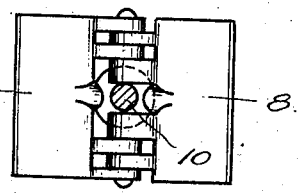

A form of anchorage member which collapses automatically when inverted, except when the pull of a chain is applied, is illustrated in Figures 2, 3 and 4. In this form two stout plates 8, 8 are hinged together and are provided with stops 9 so that they cannot open in one direction beyond a position in which they are almost in line as shown in Figure 2. In the centre of the double plate is an opening through which passes a reduced neck 10 on a bar 11 having an eye 12 for a chain at its upper end and a head 13 at its lower end.

When this device is passed downwardly between the rims of a twin wheel the two plates will fold together as shown in Figure 2, and after passing the nearest edges of the rim the plates will fall apart again so that the device cannot be withdrawn by the tension of the chain. To remove the device, after the outer end of the chain has been disconnected, the device is slipped round towards the bottom of the wheel when the plates being inverted will fall together and the device will drop out.

In the form shown in Figures 5 and 6 plates 14, 14 are pivoted at the lower ends of a bent sheet metal member 15. A rod 16 having a ring at its outer end for the attachment of a chain slides through the member 15 and has at its lower end a U-shaped trough 17. In the normal position, Figure 5, the trough engages the inner edge of the plates 14 and holds them extended. To collapse them the trough is turned through 90° and pulled up by the rod 15. The trough then engages the plates outside their pivots and positively collapses them together as shown in Figure 6. In the extending movement gravity is assisted by the rotation of the rod 15 when a transverse pin 18 on the rod between the plates 14 forces them apart.

In the form shown in Figures 7, 8 and 9, the anchorage parts are formed by cranked ends 19 of a spring steel U member 20, the ends of which are normally close together as shown in Figure 7. Pivoted on a spindle 21 passing through the U member is a bar 22 having at its lower end a cam or wedge 23 and at its upper end an eye 24 for a chain. The device is expanded by turning the bar 22 on its pivot to force the wedge between the limbs of the U member. The upper end of the bar in this position enters a slot in the base of the U member as shown in Fig. 9 so that the chain has a direct pull.

In the form illustrated in Figures 10 and 11, a bar 25 has an eye 26 at the upper end for a chain and at the other end has an outwardly cranked lug 27. A shorter bar 28 having an oppositely cranked lug 29 is hinged at its upper end to a cross-member 30 which is secured to the bar 25 in such a manner as to allow a limited rocking movement. Wedge pieces 31 are secured on or are integral with the inner faces of the bars, and working between them is a distance-piece 32 which is rotatably carried by the lower end of a rod 33 and has guiding ears fitting over the bars. The rod is screw-threaded at its upper end where it passes through the cross-member 30 and has a hexagon head for turning it with a spanner. When the rod is screwed down the distance-piece forces the bars 25 and 26 apart as shown in Figure 11, and when it is drawn up the bars are allowed to collapse together as shown in Figure 10.

In the form illustrated in Figures 12 and 13 two heavy wedge-shaped members 34 are connected together at their ends by links 35 and each is connected by links 36 to the ends of a U member 37 through which slides a rod 38 having an eye 39 at its outer end for the attachment of a chain. The lower end of the rod passes between the members 34 which are cut away to allow this and there is a head 40 on the lower extremity of the rod. When the rod is pushed down through the U member the members 34 can collapse together as shown in Figure 13 to allow the device to be inserted between the ribs of a twin wheel. When a pull is applied to the rod 38 by the chain the head 40 bearing against the inner edges of the members 34 forces them into the extended position shown in Figure 12 and they will remain in this position until the rod 38 is released again.

These forms of collapsible member are described as examples only and obviously various other forms may equally well be employed.

Claims:

1. A skid chain for twin wheels of motor vehicles comprising a collapsible anchorage member adapted to fit between the rims of the twin wheel, a chain secured at one end to the anchorage member and passing over the tyre on the outer rim, and means for retaining the other end of the chain on the outer face of the wheel.

2. A skid chain for twin wheels of motor vehicles comprising a collapsible anchorage member adapted to pass between and expand behind the rims of a twin wheel, said anchorage member being formed by a pair of hinged plates mounted on a body part, a chain secured at one end to the body part, and passing over the tyre on the outer rim of the wheel, and means for retaining the other end of the chain on the outer face of the wheel.

3. A skid chain for twin wheels of motor vehicles comprising a chain passing over a tyre on the outer rim of the twin wheel, means for anchoring one end of the chain on the outer face of the wheel, and a collapsible anchorage member for the other end of the chain, said anchorage member comprising a rod to which the chain is attached and a pair of pivoted plates freely mounted on the rod so that they may fall together to allow them to be passed between adjacent edges of the rims of the twin wheel and will fall part to engage behind the rims against which the plates are held by the pull of the chain.

4. A skid chain for twin wheels of motor vehicles comprising a chain passing over a tyre on the outer rim of the twin wheel, means for anchoring one end of the chain on the outer face of the wheel, and a collapsible anchorage member for the other end of the chain, said anchorage member comprising a rod to which the chain is attached and a pair of stout plates hinged together and slidably mounted on a reduced neck on the rod adjacent to an enlarged head, the plates having stops by which when they fall apart under gravity they are retained in a position in which they are substantially in line.

HERBERT DAVID JACKSON.
FRANK WHITE.